(12) United States Patent
Kang et al.

(10) Patent No.: US 7,934,599 B2
(45) Date of Patent: May 3, 2011

(54) METHOD FOR SEPARATION OF CONSTRUCTION WASTE

(75) Inventors: Heon-Chan Kang, Busan (KR); Kyoung-Rok Kong, Busan (KR)

(73) Assignee: Seo Bong Recycling Co., Ltd., Busan (KR)

(*) Notice: Subject to any disclaimer, the term of this patent is extended or adjusted under 35 U.S.C. 154(b) by 1137 days.

(21) Appl. No.: 10/567,768

(22) PCT Filed: Sep. 23, 2005

(86) PCT No.: PCT/KR2005/003165
§ 371 (c)(1),
(2), (4) Date: Feb. 10, 2006

(87) PCT Pub. No.: WO2006/033561
PCT Pub. Date: Mar. 30, 2006

(65) Prior Publication Data
US 2008/0164186 A1  Jul. 10, 2008

(30) Foreign Application Priority Data
Sep. 24, 2004  (KR) .................. 10-2004-0076831

(51) Int. Cl.
*B03B 5/00* (2006.01)
(52) U.S. Cl. ................... 209/172.5; 209/931
(58) Field of Classification Search ............. 209/172, 209/172.5, 173, 930, 931
See application file for complete search history.

(56) References Cited

U.S. PATENT DOCUMENTS

| | | | | |
|---|---|---|---|---|
| 2,150,917 A | * | 3/1939 | Foulke et al. | 209/172 |
| 3,578,162 A | * | 5/1971 | Jepsen | 209/172 |
| 4,173,530 A | * | 11/1979 | Smith et al. | 209/9 |
| 4,265,737 A | * | 5/1981 | Smith et al. | 209/3 |
| 5,373,946 A | * | 12/1994 | Olivier | 209/172.5 |
| 5,524,769 A | * | 6/1996 | Spencer | 209/270 |
| 6,202,855 B1 | * | 3/2001 | Omtveit et al. | 209/172 |
| 6,213,306 B1 | * | 4/2001 | Fiedlschuster et al. | 209/3 |
| 6,955,265 B2 | * | 10/2005 | Tse | 209/683 |
| 2003/0213290 A1 | * | 11/2003 | James et al. | 73/73 |
| 2007/0084765 A1 | * | 4/2007 | Tse | 209/689 |

FOREIGN PATENT DOCUMENTS

| | | |
|---|---|---|
| JP | 56-63090 | 5/1981 |
| JP | 9-253523 | 9/1997 |
| JP | 12-131313 | 5/2000 |
| JP | 14-30588 | 1/2002 |
| KR | 95-0004656 | 5/1995 |

* cited by examiner

*Primary Examiner* — Stefanos Karmis
*Assistant Examiner* — Kalyanavenkateshware Kumar
(74) *Attorney, Agent, or Firm* — Schmeiser, Olsen & Watts LLP

(57) ABSTRACT

Disclosed herein is a method for separation of construction waste. In the method, the construction waste, crushed to a predetermined size, is added to liquid in a precipitation tank and separated into components in the tank according to specific gravity, in which the liquid has a reference specific gravity lower than that of a component to be recovered but higher than that of the remaining components, such that only the component to be recovered is separated by precipitation to the bottom of the precipitation tank. According to the method, high-quality recyclable aggregate contained in the construction waste can be easily separated from other impurities through a simple process. Particularly, the reference specific gravity of the separation liquid is suitably adjusted so that the recyclable aggregate can be easily separated even from impurities (tiles, red brick, asphalt concrete, cement paste mass, etc.) heavier than water, unlike the prior separation process using an aerated water tank.

8 Claims, 2 Drawing Sheets

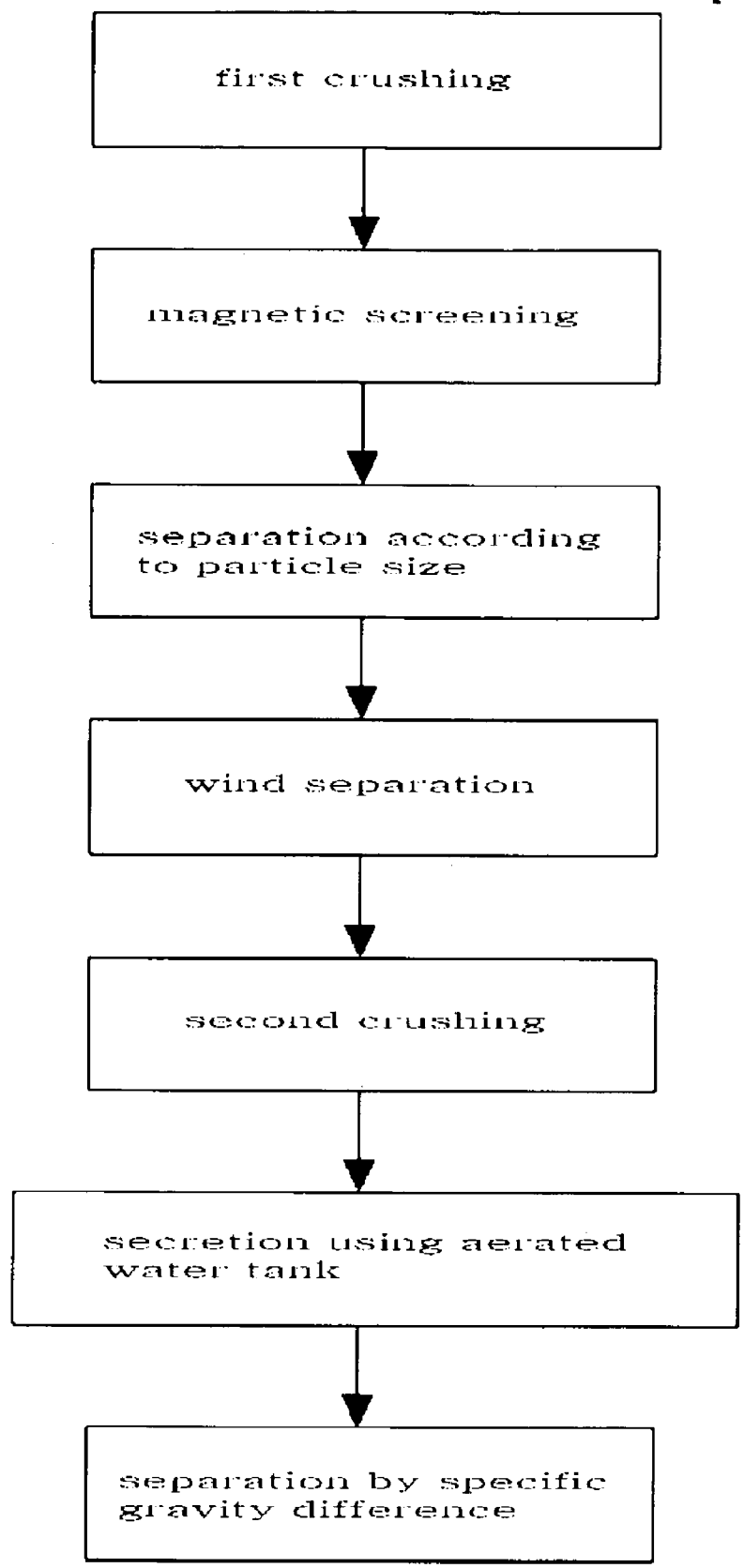
[Fig. 1]

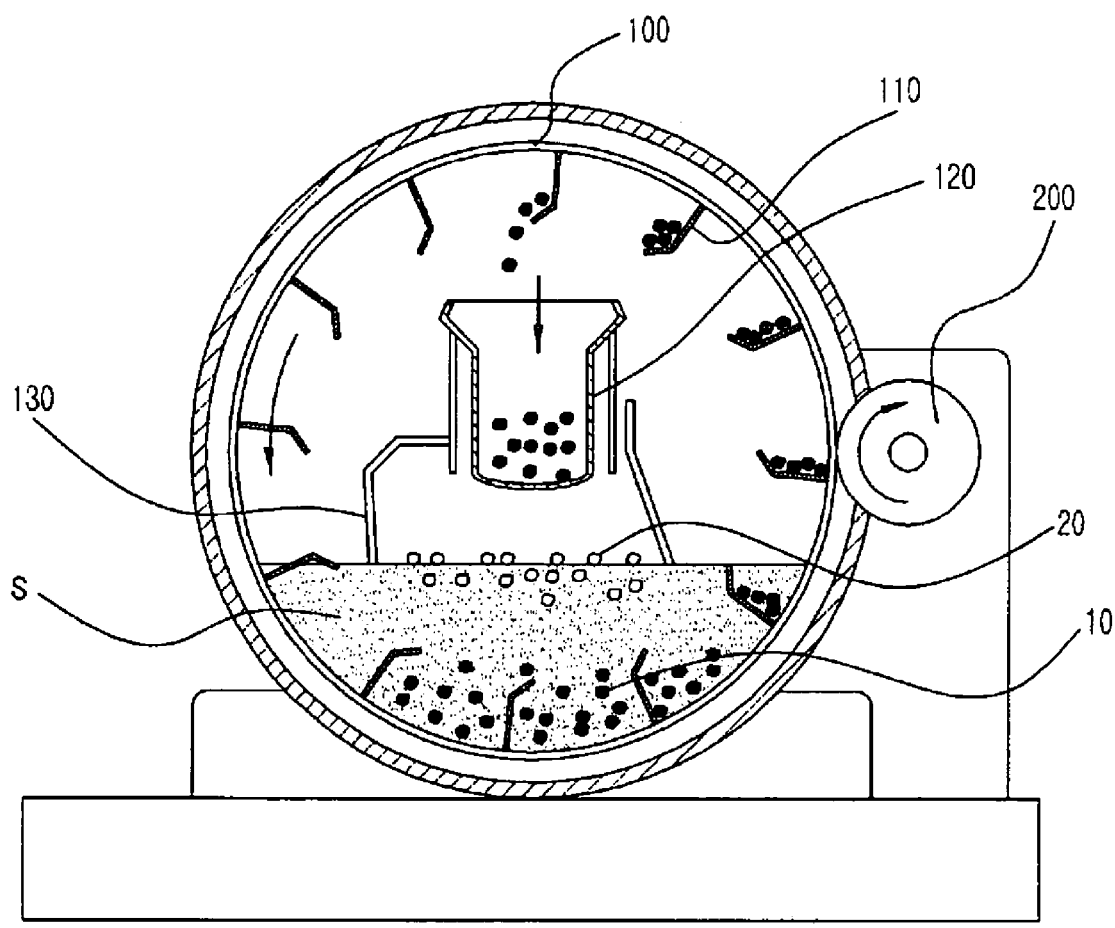
[Fig. 2]

METHOD FOR SEPARATION OF CONSTRUCTION WASTE

TECHNICAL FIELD

The present invention relates to a method for separation of construction waste, and more particularly to a method for separation of construction waste into recyclable aggregate and impurities, such as asphalt concrete (Ascon), red bricks, tiles, wood debris and cement paste, in which the construction waste crushed to a given size in a pretreatment process is separated into components according to specific gravity difference.

BACKGROUND ART

Recently, as the redevelopment of urban areas and the large-scale reconstruction of dilapidated apartments are actively conducted, a large amount of construction waste is generated every year, and it is expected that the generation of such construction waste will further increase in the future.

However, such construction waste is mostly buried in the ground without being treated or is thrown away, which causes severe soil contamination. For this reason, various attempts to recycle the construction waste are currently being made, but the proportion of construction waste being recycled is very insignificant, so that only a small amount of the construction waste is recycled as material or filler for forming roadbeds in road construction.

In one example of the prior methods for separating the construction waste into components, recyclable aggregate is ultimately recovered through the following various processes.

Collected construction waste is first crushed through a jaw crusher, and impurities, such as steel reinforcing members, contained in the crushed construction waste, are removed by magnetic separation.

Also, impurities, such as vinyl, paper, styrene foam and wood debris, are removed through air separation, and the remaining material is subjected to second and third crushing steps using a cone crusher, a roll crusher and/or an impact crusher.

The crushed material is then separated into components according to particle size. Finally, the remaining material is subjected to a separation process using an aerated water tank, in which still more impurities, which float on water are removed so as to recover recyclable aggregate.

However, even when the separation process using the aerated water tank is carried out, it is impossible to remove wood debris, red bricks, tiles, asphalt concrete, cement paste, etc, by specific gravity separation using water, because they have a specific gravity higher than 1 (the specific gravity of water).

As a result, the recovered recyclable aggregate contains significantly large amounts of impurities, such as cement paste, asphalt concrete, red bricks, tiles and cement paste, which cause an increase in water absorption and a reduction in specific gravity, resulting in reduced strength. The recovered recyclable aggregate is regarded as low-grade aggregate, so its use is limited to material for road base layers, etc.

Accordingly, there is an urgent need for the development of a separation method capable of recovering only good-quality recyclable aggregate by accurately separating recyclable aggregate from the asphalt concrete, red bricks, tiles and cement paste contained in construction waste.

DISCLOSURE

Technical Problem

Therefore, the present invention has been made to solve the above-mentioned problems, and it is an object of the present invention to provide a method for separation of construction waste into recyclable aggregate and impurities, such as asphalt concrete, red bricks, tiles, wood debris and cement paste, in which the construction waste crushed to a given size in a pretreatment process is separated into components according to specific gravity such that only good-quality recyclable aggregate is recovered.

Technical Solution

To achieve the above object, the present invention provides a method for separation of construction waste, in which the construction waste crushed to a predetermined size is added to a liquid in a precipitation tank and separated into components according to specific gravity in the tank, in which the liquid has a reference specific gravity lower than that of the component to be recovered but higher than that of the remaining components, such that only the component to be recovered is separated by precipitation to the bottom of the precipitation tank.

Preferably, the liquid is obtained by diluting a heavy reagent in a diluent to obtain reference specific gravity, said reagent being tetrabromoethane and the diluent being alcohol.

Preferably, the liquid is a suspension obtained by diluting a heavy medium in water to have a reference specific gravity, in which the medium is selected from the group consisting of magnetite powder, ferrosilicon powder, hematite powder, galena powder and a mixture thereof.

Preferably, the component to be recovered is recyclable aggregate, and the remaining components are impurities having a specific gravity lower than that of the aggregate.

Preferably, the specific gravity of each component of the construction waste, which is used for determining the reference specific gravity of the liquid, is based on surface-dry density measured in a state in which each of the components contains a sufficient amount of water held therein. Also, the reference specific gravity of the liquid is preferably in the range of 2.35-2.5.

Preferably, each component of the construction waste, which is added to the liquid in the precipitation tank, has been crushed to a particle size of 10-50 mm.

Preferably, the inventive method further comprises the step of stirring the precipitation tank such that the liquid is maintained at a uniform specific gravity.

Preferably, the inventive method further comprises the steps of: measuring the specific gravity of the liquid in the precipitation tank; and adding the medium into the precipitation tank if the measured specific gravity is lower than the reference specific gravity, or adding water into the tank if the measured specific gravity is higher than the reference specific gravity.

Preferably, the inventive method comprises the steps of: stirring the cylindrical precipitation tank by rotating it using a driving unit such that the medium dispersed in the tank is maintained as a stable suspension; introducing into the precipitation tank the construction waste crushed to a predetermined size; recovering the component precipitated to the bottom of the precipitation by lifting up the component by means of rotating plates attached to the inner wall of the precipitation tank and allowing the lifted component to fall down into a recovering unit placed at the central portion; and gathering the remaining components floating on the suspension at the central portion by pushing them with guide plates and discharging the gathered components from the precipitation tank.

As used herein, the term "construction waste" means a mixture containing, in addition to an aggregate component, impurities, such as asphalt concrete, red bricks, cement paste mass and tiles. The term "recyclable aggregate" means high quality aggregate which is contained in the construction waste and is the component desired to be recovered.

Advantageous Effects

As described above, according to the present invention, the high-quality recyclable aggregate contained in the construction waste can be easily separated from other impurities through a simple process. Particularly, by suitably adjusting the reference specific gravity of the separation liquid, the high-quality recyclable aggregate can be easily separated, even from impurities (tiles, red bricks, asphalt concrete, cement paste, etc.) heavier than water, unlike the prior separation process using the aeration water tank.

Also, the use of the suspension as the separation liquid allows a large amount of recyclable aggregate to be generated at a relatively low cost, and thus, provides an excellent effect in terms of economic efficiency.

As a result, according to the present invention, recyclable aggregate useable as an aggregate for general structures can be produced from construction waste at low cost.

DESCRIPTION OF DRAWINGS

FIG. 1 is a flow chart showing a separation process comprising a separation method according to an embodiment of the present invention.

FIG. 2 is a schematic diagram of a separation apparatus for carrying out a separation method according to an embodiment of the present invention.

BEST MODE

Hereinafter, a preferred embodiment of the present invention will be described in detail with reference to the accompanying drawings.

FIG. 1 is a flow chart showing a separation process comprising a separation method according to an embodiment of the present invention.

As shown in FIG. 1, in order to produce recyclable aggregate from general construction waste, the construction waste is subjected to a first crushing step using a jaw crusher and a second crushing step using a cone crusher. Then, the crushed material is subjected to magnetic separation to remove iron reinforcing members, etc., and separated into components according to particle size. Also, the crushed material is subjected to wind separation to remove impurities (e.g., vinyl, paper, styrene foam, wood debris, etc.). Then, the crushed material is placed in an aerating tank containing water, in which impurities floating on the water are removed.

Through these steps, recyclable aggregate having a particle size of 10-50 mm is finally produced which contains, in addition to an aggregate component, impurities, such as asphalt concrete, red brick, cement paste mass and tiles.

The present inventors analyzed the general physical properties of the recyclable aggregate, cement paste mass, red brick, asphalt concrete and tiles contained in construction waste, and the results are shown in Table 1 below.

TABLE 1

| | Surface-dry density | Absolute dry density | True density |
|---|---|---|---|
| Recyclable aggregate | 2.61 | 2.55 | 2.72 |
| Cement paste mass | 2.22 | 2.01 | 2.53 |
| Red brick | 2.17 | 1.92 | 2.58 |
| Asphalt concrete | 2.32 | 2.27 | 2.39 |
| Tiles | 2.12 | 1.89 | 2.45 |

Table 1 shows the following properties: true density obtained by measuring the true specific gravity of each component contained in the construction waste; absolute dry density measured after completely drying recyclable aggregate and various impurity components (cement past mass, red brick, asphalt concrete, tiles, etc.) in a dryer; and surface-dry density measured in a state where each of the components contains a sufficient amount of water held therein.

The specific gravity of aggregate does not means actual specific gravity, but rather means apparent specific gravity measured in a state including fine internal cracks and fine surface grooves. Thus, the specific gravity of aggregate varies depending on the water content of the aggregate.

The surface-dry state refers to a state where the internal cracks and surface grooves of the aggregate are filled with water but the surface of the aggregate is not wet. The surface-dry state is used as the reference state, particularly in the design of concrete mix. The surface-dry density means the density in this surface-dry state.

As can be seen in Table 1, the impurity components contained in construction waste have a specific gravity higher than that of water. Thus, these impurity components could not be completely separated from recyclable aggregate by the prior art wind separation or separation using the aerated water tank.

In this embodiment, the recyclable aggregate and impurity components in construction waste are separated from each other by taking advantage of the difference in specific gravity therebetween, in which the reference specific gravity of the liquid used for the separation is determined with reference to the surface-dry density data shown in Table 1 above. Also, as the separation liquid having the reference specific gravity, a heavy liquid having a high specific gravity higher than 2.5 is used after dilution.

Namely, by using the separation liquid having a high specific gravity of about 2.45, the recyclable aggregate is precipitated, but the impurities, such as asphalt concrete, tiles, red brick, wood debris and cement paste mass, are separated by floatation.

For this purpose, in this embodiment, tetrabromoethane (specific gravity: 2.964) as the heavy liquid reagent is diluted with alcohol to make a separation liquid having a specific gravity of about 2.45. Into the precipitation tank containing the separation tank, construction waste is introduced so that recyclable aggregate having specific gravity higher than that of the separation liquid is precipitated and impurity components (e.g., asphalt concrete, tiles, red bricks and cement paste masses) having specific gravity lower than that of the separation liquid are separated by floatation.

Hereinafter, another embodiment of the present invention will be described.

A pretreatment process is performed in a manner similar to the above-described embodiment to provide construction waste (a mixture of recyclable aggregate and impurities) having a particle size of 10-50 mm.

In this embodiment, a suspension obtained by dispersing a heavy medium in water so as to increase the apparent specific gravity of water is used as the suspension liquid.

Namely, the heavy medium is dispersed in water in the precipitation tank to make a suspension having an apparent specific gravity of about 2.45. Then, construction waste is introduced into the precipitation tank containing the suspension, so that recyclable aggregate is separated by precipitation, whereas asphalt concrete, tiles, red brick, cement paste, etc., are separated by floatation.

In general, if a heavy medium is dispersed in water, the actual specific gravity of the water will not be increased, but a suspension having a heavy medium dispersed therein can act as a heavy liquid having a high specific gravity. The specific gravity of this suspension is expressed as apparent specific gravity.

As the heavy medium dispersed in water, magnetite powder, ferrosilicon powder, hematite powder, galena powder or the like is preferably used. Moreover, a mixture of these powders may also be used.

FIG. 2 is a schematic diagram of a separation apparatus for carrying out the inventive preparation method. The separation method according to this embodiment can be performed using an apparatus like that illustrated in FIG. 1.

A heavy medium (e.g., magnetite powder or ferrosilicon powder) is dispersed in water to make a suspension (S) having an apparent specific gravity of about 2.45. Then, a cylindrical precipitation tank 100 is stirred by rotation using a driving unit 200 so that the dispersed medium is maintained as a stable suspension (S) without precipitation.

During this step, into the lower portion of the precipitation tank 100, the suspension (S) may also be continuously supplied as pressurized water or together with pressurized air. Preferably, the apparent specific gravity of the suspension (S) is measured with a specific gravity-measuring device (not shown), and if the measured value is lower than the reference specific gravity, the medium powder will be added to the suspension, and if the measured value is higher than the reference specific gravity, water will be added to the suspension.

The physical property of each material used as the medium in the suspension is shown in Table 2 below.

TABLE 2

| Medium | Specific gravity |
| --- | --- |
| Magnetite powder | 5.18 |
| Ferrosilicon powder | 7.0 (10% Si) |
| Hematite powder | 5.18 |
| galena powder | 7.5 |

The medium having the physical property shown in Table 2 is dispersed in water in the form of particles having a size of about 100 mesh to make the suspension (S).

Also, Equation 1 below is used to adjust the apparent specific gravity of the suspension to the required reference specific gravity (2.45 in this embodiment).

$$L = \frac{100M}{W + (100 - W)M}$$ Math Figure 1 wherein W=the weight (g) of the medium in 100 g of the suspension, M=the specific gravity of the medium, and L=the apparent specific gravity of the suspension.

When construction waste (a mixture of recyclable aggregate and impurity components) crushed to a size of 10-50 mm is introduced into the precipitation tank 100, a recyclable aggregate 10 is precipitated to the bottom and then lifted up by the rotating plates 110 attached to the inner wall of the precipitation tank so that it falls down into a recyclable aggregate-recovering unit 120. The fallen recyclable aggregate 10 is discharged out of the precipitation tank by a transport means (not shown), such as a conveyor. This recyclable aggregate 10 is heavier than the apparent specific gravity of the suspension (S) and contains little or no cement paste.

Meanwhile, impurity components 20 (asphalt concrete, tiles, red bricks, cement paste mass, wood debris, etc.) lighter than the apparent specific gravity of the suspension (S) float on the suspension (S) and are gathered at the central portion by pushing them with guide of guide plates 130 so that they are discharged out of the precipitation tank by a separate discharge means (not shown).

When the suspension as described in this embodiment is used as the liquid for separating the recyclable aggregate from the impurity components, an advantage in terms of economic efficiency will be obtained because the medium is relatively inexpensive.

In the above embodiments, the recyclable aggregate and the impurities are separated from each other in the separation liquid (dilution or suspension). Thus, the specific gravity of each component of construction waste, which is used for determining the reference specific gravity of the separation liquid, is based on surface-dry density measured in a state in which each of the components contains a sufficient amount of water held therein.

Furthermore, in the above embodiments, the reference specific gravity of the separation liquid is given as 2.45. However, in view of the specific gravity of each component of construction waste as shown in Table 1, the reference specific gravity of the separation liquid can be suitably adjusted within a range of 2.35-2.5.

Also, it is preferable that each component of construction waste, which is introduced into the liquid in the precipitation tank, be crushed to a particle size of 10-50 mm in a pretreatment process in view of the effect of separation by specific gravity difference or the operation of the overall process.

In addition, the illustrated separation apparatus can be used in the case of using not only the suspension but also the heavy liquid.

The present invention as described above may be practiced in other various forms without departing from its technical concepts or main features. Accordingly, it should be understood that the embodiments disclosed herein are presented not by way of limitation but by way of illustration in all aspects.

For example, in the above embodiments, recyclable aggregate having the highest specific gravity is considered the component to be recovered, and the remaining components are considered impurities to be discarded. However, if a specific component having a low specific gravity is to be separated and recovered, the process will be performed in reverse to the above embodiments, in which case the desired component will be separated through multiple stages having separation liquids with several specific gravity values.

The invention claimed is:

1. A method for separation of construction waste, in which construction waste crushed to a predetermined size is added to a liquid in a precipitation tank and separated into components in the tank according to specific gravity, in which the liquid has a reference specific gravity lower than that of a component to be recovered but higher than that of the remaining components, such that only the component to be recovered is separated by precipitation to the bottom of the precipitation tank; wherein the liquid is a suspension obtained by diluting a heavy medium in water to have a reference specific gravity;

which further comprises the steps of:

stirring the cylindrical precipitation tank by rotation using a driving unit such that the medium dispersed in the tank is maintained as a stable suspension;

introducing the construction waste crushed to a predetermined size into the precipitation tank;

recovering the component precipitated to the bottom of the precipitation by lifting up the component by means of a plurality of rotating plates attached around the inner wall of the precipitation tank and allowing the lifted component to fall down into a recovering unit placed at a central portion of the precipitation tank;

gathering the remaining components floating on the suspension at the central portion by pushing with guide plates and discharging the gathered components from the precipitation tank; and measuring the specific gravity of the liquid in the precipitation tank; and adding the medium into the precipitation tank if the measured specific gravity is lower than the reference specific gravity, or adding water into the tank if the measured specific gravity is higher than the reference specific gravity;

and the component to be recovered is recyclable aggregate, and the remaining components are impurities having a specific gravity lower than that of the aggregate, and the specific gravity of each component of the construction waste, which is used for determining the reference specific gravity of the liquid, is based on surface-dry density measured in a state where each of the components contained a sufficient amount of water held therein.

2. The method of claim 1, wherein the medium is selected from the group consisting of magnetite powder, ferrosilicon powder, hematite powder, galena powder and a mixture thereof.

3. The method of claim 1, wherein the reference specific gravity of the liquid is in a range of 2.35-2.5.

4. The method of claim 2, wherein the reference specific gravity of the liquid is in a range of 2.35-2.5.

5. The method of claim 1, wherein each component of the construction waste, which is added to the liquid in the precipitation tank, has been crushed to a size of 10-50 mm.

6. The method of claim 2, wherein each component of the construction waste, which is added to the liquid in the precipitation tank, has been crushed to a size of 10-50 mm.

7. The method of claim 1, which further comprises a step of stirring the precipitation tank such that the liquid is maintained at a uniform specific gravity.

8. The method of claim 2, which further comprises a step of stirring the precipitation tank such that the liquid is maintained at a uniform specific gravity.

* * * * *